United States Patent Office 3,467,464
Patented Sept. 16, 1969

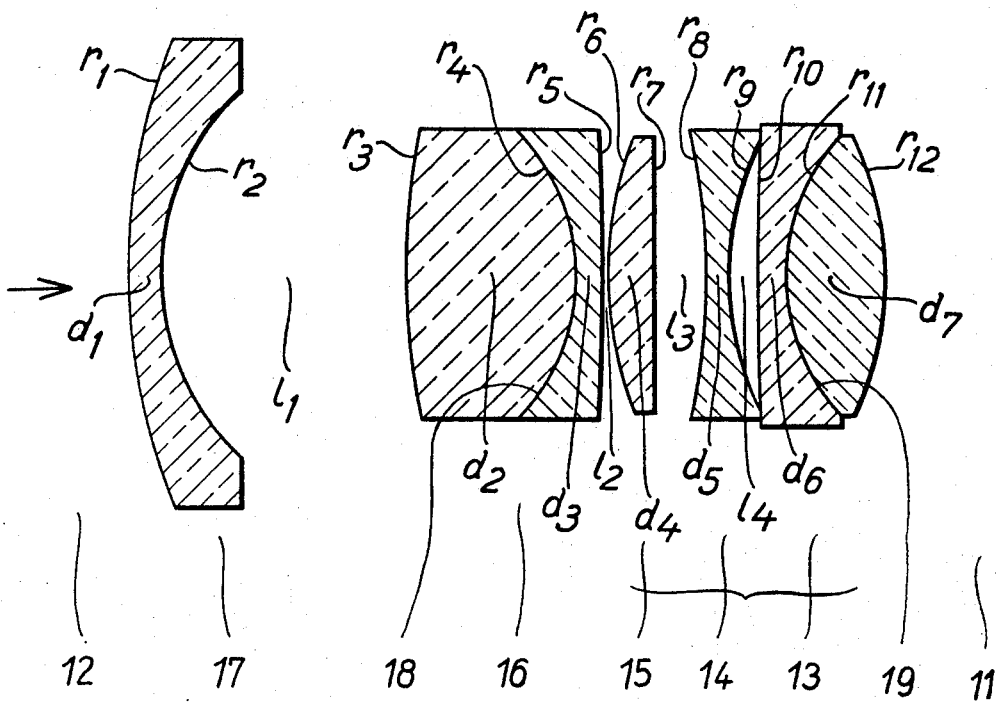

---

3,467,464
PHOTO LENS WITH A SHORT FOCAL LENGTH AND LARGER BACK INTERCEPTOR FOCAL LENGTH
Rudolf Ruehl, Wetzlar, Germany, assignor to Ernst Leitz G.m.b.H., Wetzlar an der Lahn, Germany
Filed Mar. 28, 1966, Ser. No. 537,801
Claims priority, application Germany, Apr. 8, 1965,
L 50,417
Int. Cl. G02b 9/60
U.S. Cl. 350—216   1 Claim

ABSTRACT OF THE DISCLOSURE

A photo lens system having a lens with a short focal length and a back intercept length greater than the focal length, comprising three components: a triplet as the main part of the system; at least one collecting component and a negative meniscus; said at least one component having two elements joined at a first collecting cemented surface, said negative meniscus positioned as the front part of the lens; said collecting component interposed spaced from said meniscus and adjacent to said triplet.

---

Field of the invention

The present invention relates to a photographic lens having a short focal length with a larger back or intercept focal length.

Summary of the invention

The objects of the present invention are:

To provide an improvement over a lens system of the series-connected inverse Galilean telescope type, such as described in U.S. Patent 1,934,561, with an increased back intercept length by a series connection of a negative lens and by additional series connection of a collecting component between the negative lens and the image forming system proper;

To provide a photographic lens system of short focal length with a large back focus on the image side for use in a monocular reflex camera;

To provide the above lens system having an improved astigmatic correction of the curvature of the image field in conjunction with a very small opening error;

To provide a lens of the type mentioned comprising: a negative meniscus as the front part of the lens, a collecting component positioned behind the meniscus with a first collecting cemented surface, with a substantial air space between them, and a triplet positioned behind and adjacent the collecting component, the triplet having a rearmost element provided with a second collecting cemented surface, both collecting surfaces curved toward the center of the lens;

To provide a lens system of the type described comprising further a pivoting mirror interposed in the interstitial space between the vertex of the last lens and the plane of the film;

To provide a lens system of the type mentioned having a given focal length $f=1.0$, an aperture ratio 1:2.8 and the back focal length on the image side for $e$ line $s'=1.0918$ with definite radii of curvature of the refracting surfaces $r$, correlated with the axial length thicknesses $d$, the refraction indices $n$, and the Abbe values $v$ referred to the $e$ line;

And to provide tolerance limits to the above mentioned correlations.

Other objects and many of the attendant advantages of this invention will be readily appreciated as the same becomes better understood by reference to the following detailed description when considered in connection with the accompanying drawing in which like reference numerals designate like parts throughout the figures thereof.

Brief description of the drawing

The sole figure of drawings is a cross-sectional view of the lens system of the present invention viewed perpendicular to the longitudinal axis, the front of the lens and direction of incoming light being indicated by an arrow.

Description of the preferred embodiment

Referring in detail to this figure, the three basic components of the lens system, proceeding from the back 11 of the objective to the front 12, are a triplet 13, 14, 15, a cemented collecting component 16 and a negative meniscus 17. In the embodiment of the invention shown, the focal length $f=1.0$, the aperture ratio is 1:2.8 and the back focal or intercept length on the image-side for the $e$ line is $s'=1.0918\ f$. The following table gives values for the various parameters of the objective. Both in the table and in the figure, are shown the radii of curvature of the refracting surfaces $r$; the axial length thicknesses $d$; the axial air distances $l$; the indices of refraction $n$ and the Abbe values $v$.

TABLE OF VALUES FOR VARIOUS PARAMETERS OF THE LENS

[$f=1.0$; $s'=1.0918$; Aperture ratio 1:2.8]

|  |  | $n_e$ | $v_e$ |
|---|---|---|---|
| $r_1 = +1.115$ | | | |
| $r_2 = +0.446$ | $d_1=0.064$ | 1.4892 | 69.9 |
| $r_3 = +1.489$ | $l_1=0.439$ | | |
| $r_4 = -0.368$ | $d_2=0.303$ | 1.6713 | 41.6 |
| $r_5 = -3.293$ | $d_3=0.053$ | 1.6299 | 38.8 |
| $r_6 = +0.674$ | $l_2=0.003$ | | |
| $r_7 = -17,428$ | $d_4=0.085$ | 1.6241 | 60.1 |
| $r_8 = -1.141$ | $l_3=0.095$ | | |
| $r_9 = +0.541$ | $d_5=0.043$ | 1.7046 | 34.6 |
| $r_{10}=+11.455$ | $l_4=0.056$ | | |
| $r_{11}=+0.358$ | $d_6=0.043$ | 1.6734 | 46.9 |
| $r_{12}=-0.575$ | $d_7=0.180$ | 1.6940 | 54.6 |

$r$ representing the radii of curvature of the refracting surfaces; $d$ the axial thickness of the lens; $l$ the axial air distance and $v$ the Abbe value.

The indices of refraction $n$ and the Abbe values $v$ are referred to the $e$-line.

In accordance with the present invention, excellent astigmatic correction of the curvature of the image field plus a very small opening error are achieved by having the cemented surfaces 18 and 19 in the collecting member and the rearmost member respectively designed as collecting cemented surfaces curved, as shown, toward the center of the objective; by having the refractive difference at both cemented surfaces smaller than 0.08; and by having the radii of curvature of both cemented surfaces smaller than 0.5 times the total focal length of the objective.

An objective built according to the presented table makes it possible to build a short focal length monocular reflex camera with room available for insertion of a pivoting mirror in the space between the last lens vertex and the plane of the film. A deviation from the data indicated is possible up to 20% with respect to the surface refractive powers $$\left(\frac{\Delta n}{r}\right)$$

up to 10% with respect to the lens thicknesses and air distances, and up to approximately ±0.05 with respect to the refractive indices of the glasses being used.

It should be understood, of course, that the foregoing disclosure relates to only preferred embodiments of the invention and that it is intended to cover all changes and modifications of the examples of the invention therein chosen for the purposes of the disclosure, which do not constitute departures from the spirit and scope of the invention.

I claim:
1. A photo lens system having a lens with a short focal length and a back intercept length greater than the focal length, comprising three components; a triplet as the main part of the system; at least one collecting component and a negative meniscus; said at least one component having two elements joined at a first collecting cemented surface, said negative meniscus positioned as the front part of the lens; said collecting component interposed spaced from said meniscus and adjacent to said triplet; the parameters of the lens having the following values:

TABLE OF VALUES FOR VARIOUS PARAMETERS OF THE LENS

[$f=1.0$; $s'=1.0918$; Opening ratio 1:2.8]

| | | $n_e$ | $v_e$ |
|---|---|---|---|
| $r_1 = +1.115$ | | | |
| | $d_1 = 0.064$ | 1.4892 | 69.9 |
| $r_2 = +0.446$ | | | |
| | $l_1 = 0.439$ | | |
| $r_3 = +1.489$ | | | |
| | $d_2 = 0.303$ | 1.6713 | 41.6 |
| $r_4 = -0.368$ | | | |
| | $d_3 = 0.053$ | 1.6299 | 38.8 |
| $r_5 = -3.293$ | | | |
| | $l_2 = 0.003$ | | |
| $r_6 = +0.674$ | | | |
| | $d_4 = 0.085$ | 1.6241 | 60.1 |
| $r_7 = -17,428$ | | | |
| | $l_3 = 0.095$ | | |
| $r_8 = -1.141$ | | | |
| | $d_5 = 0.043$ | 1.7046 | 34.6 |
| $r_9 = +0.541$ | | | |
| | $l_4 = 0.056$ | | |
| $r_{10} = +11.455$ | | | |
| | $d_6 = 0.043$ | 1.6734 | 46.9 |
| $r_{11} = +0.358$ | | | |
| | $d_7 = 0.180$ | 1.6940 | 54.6 |
| $r_{12} = -0.575$ | | | |

The indices of refraction $n$ and the Abbe values $v$ are referring to the $e$-line, $r$ representing the radii of curvature of the refracting surfaces; $d$ the axial thickness of the lens; $l$ the axial air distance and $v$ the Abbe values.

References Cited

UNITED STATES PATENTS 2,983,191   5/1961   Lautenbacher _____ 340—216
3,217,598   11/1965   Soiisch et al. ____ 350—215 X JOHN K. CORBIN, Primary Examiner